L. D. Wynkoop,
Water Wheel,

№ 52,353. Patented Jan. 30, 1866.

Attest:

Inventor:
L. D. Wynkoop

UNITED STATES PATENT OFFICE.

L. D. WYNKOOP, OF OWOSSO, MICHIGAN.

IMPROVEMENT IN WATER-WHEELS.

Specification forming part of Letters Patent No. 52,353, dated January 30, 1866.

*To all whom it may concern:*

Be it known that I, L. D. WYNKOOP, of Owosso, in the county of Shiawassee and State of Michigan, have invented a new and Improved Water-Wheel; and I do hereby declare that the following is a full, clear, and exact description thereof, which will enable those skilled in the art to make and use the same, reference being had to the accompanying drawings, forming part of this specification, in which—

Figure 1:
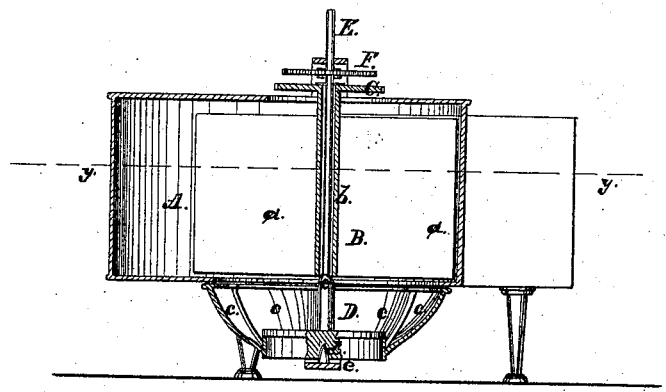
Figure 2:
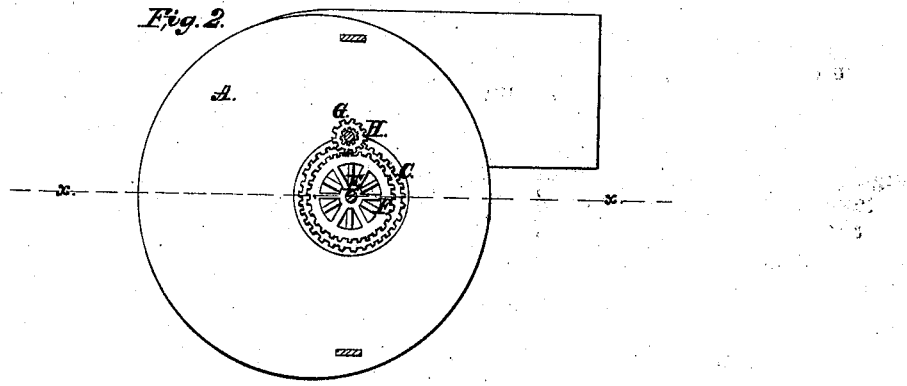
Figure 3:
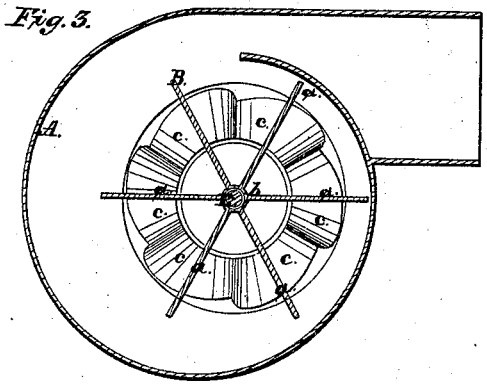

Figure 1 is a vertical section of my invention, taken in the line $x\ x$, Fig. 2; Fig. 2, a plan or top view of the same; Fig. 3, a horizontal section of the same, taken in the line $y\ y$, Fig. 1.

Similar letters of reference indicate corresponding parts.

This invention relates to a combination of two wheels arranged in such a manner as to be acted upon, one by the direct and the other by the reacting power of the water, and a very large percentage of the power of the water which passes through the wheels obtained and transmitted to one shaft from which the power is taken.

A represents a scroll in which a direct-action wheel, B, is placed, the latter being provided with radial buckets $a$ and a tubular shaft, $b$, having a toothed wheel, C, upon it above the scroll A.

D is a reaction-wheel, which is at the lower end of a shaft, E, the latter passing up through the tubular shaft $b$ and having a toothed wheel, F, upon it. The shaft E has a shoulder, $c$, upon it, to serve as a bearing for the lower end of the tubular shaft $b$, as shown in Fig. 1.

The wheel D is below the scroll A, and it is of dish form, its buckets $e$ lapping over each other, with a space or issues between for the escape of the water which enters the wheel D after acting upon wheel B.

The lower end of the shaft D is fitted upon a point or step, $d$, in a bridge-tree, $e$, below the scroll.

When water is admitted into the scroll A the wheel B is rotated by the percussive force of the water, or by impact, and then passes down into wheel D, which is rotated by its reacting or gravitating force. The toothed wheels C F gear into wheels G, which are on a shaft, H, the power of both wheels being thereby transmitted to said shaft.

By this arrangement a large percentage of the power of the water is obtained and the wheels made to act harmoniously together, one not interfering with or made to serve as a drag to the other.

Having thus described my invention, I claim as new and desire to secure by Letters Patent—

The combination of the two wheels B D, arranged as shown in relation with the scroll A, and connected with a shaft, H, from which the power is taken, substantially as herein shown and described.

L. D. WYNKOOP.

Witnesses:
N. McBAIN,
N. H. ROBINSON.